T. C. JACKSON.
SCOW FOR TRANSPORTING GRAVEL AND THE LIKE.
APPLICATION FILED OCT. 13, 1911.
1,018,565.
Patented Feb. 27, 1912.
2 SHEETS—SHEET 1.
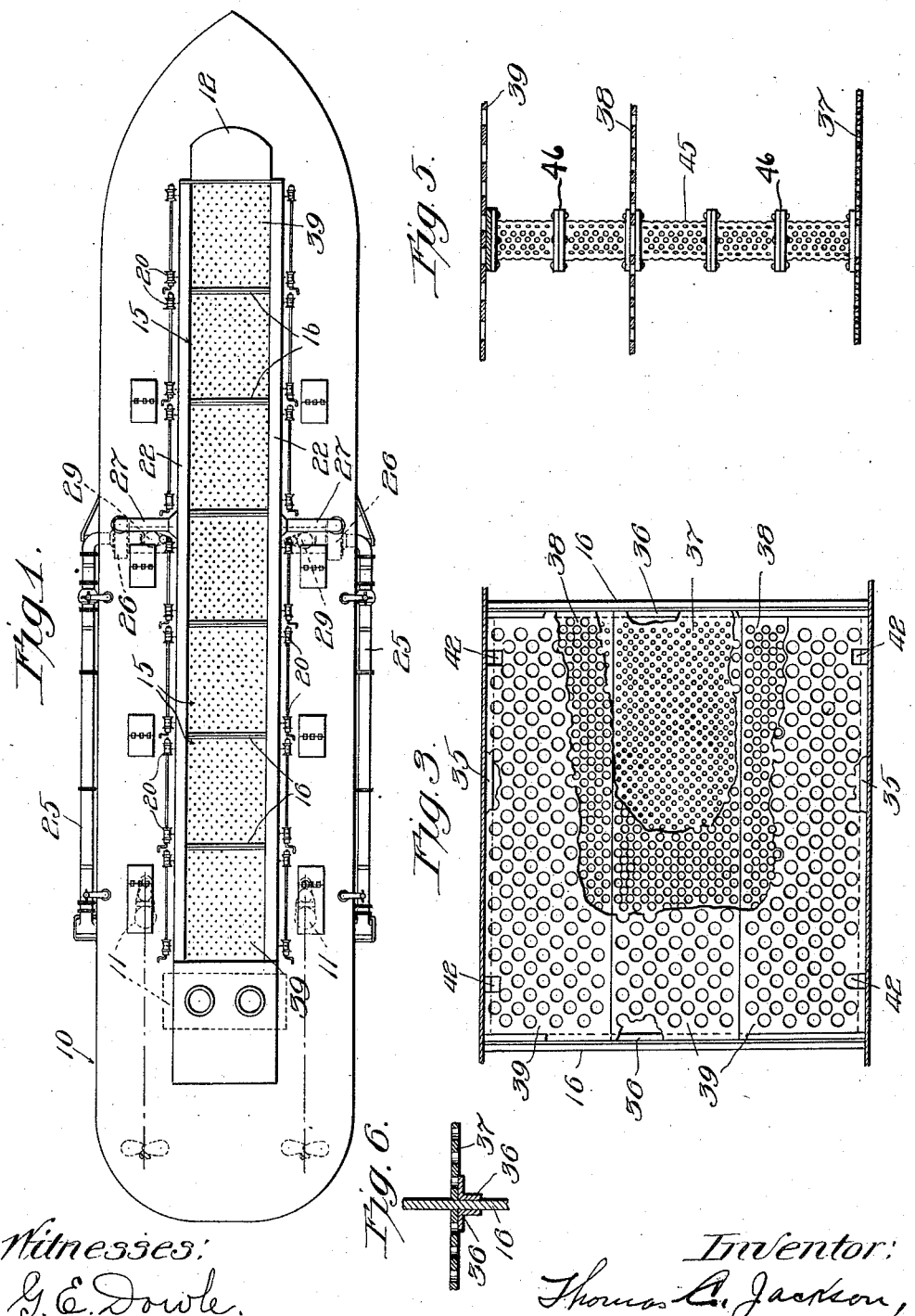

T. C. JACKSON.
SCOW FOR TRANSPORTING GRAVEL AND THE LIKE.
APPLICATION FILED OCT. 13, 1911.
1,018,565.
Patented Feb. 27, 1912.
2 SHEETS—SHEET 2.
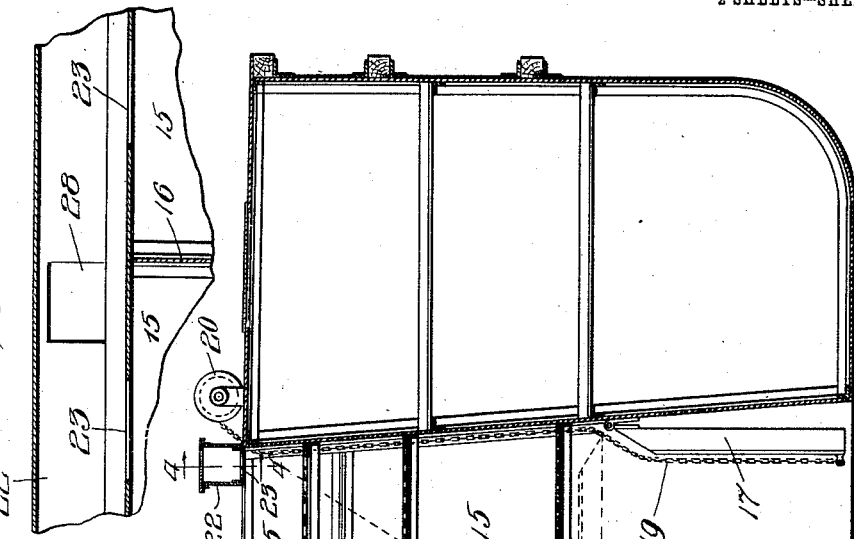
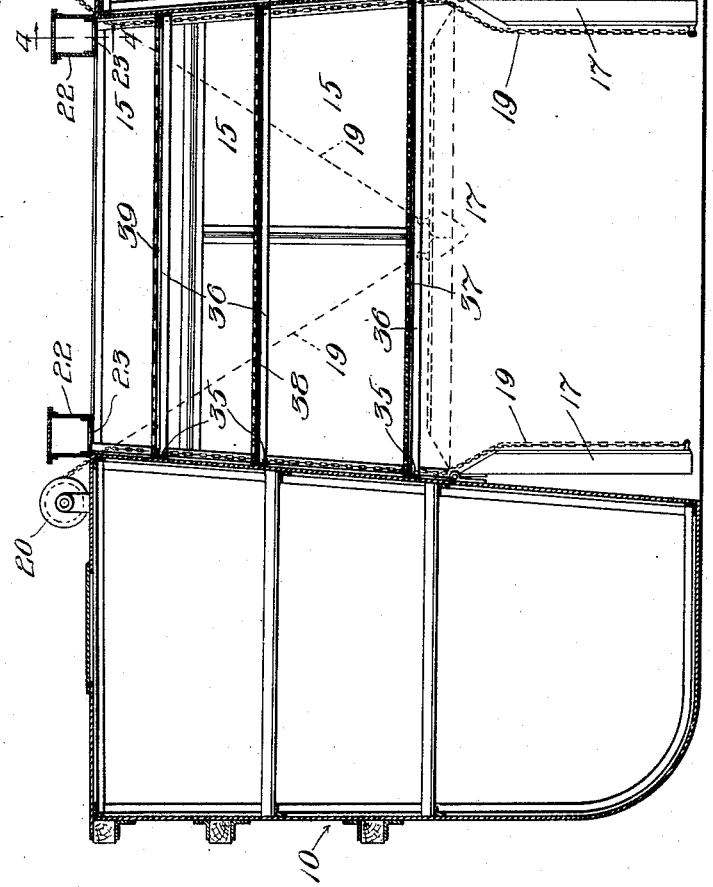
Witnesses:
Inventor.
Thomas C. Jackson,
by William H. Hall,
Att'y

UNITED STATES PATENT OFFICE.

THOMAS C. JACKSON, OF CHICAGO, ILLINOIS, ASSIGNOR OF ONE-THIRD TO ROSE J. A. SHANKS, OF CHICAGO, ILLINOIS.

SCOW FOR TRANSPORTING GRAVEL AND THE LIKE.

1,018,565.

Specification of Letters Patent.   Patented Feb. 27, 1912.

Application filed October 13, 1911.   Serial No. 654,452.

*To all whom it may concern:*

Be it known that I, THOMAS C. JACKSON, a citizen of the United States, and a resident of Chicago, in the county of Cook and State of Illinois, have invented certain new and useful Improvements in Scows for Transporting Gravel and the Like; and I do hereby declare that the following is a full, clear, and exact description thereof, reference being had to the accompanying drawings, and to the characters of reference marked thereon, which form a part of this specification.

This invention relates to a novel scow or boat for transporting gravel or gravel and sand loaded thereon from the bottom of a lake or other body of water, and the invention relates more specifically to means for receiving the material in the compartments of the scow so as to grade the material in predetermined meshes, or to return the material which is of too fine a mesh for use back to the bottom of the body of water from which it was taken.

The invention consists in the matters hereinafter set forth and more particularly pointed out in the appended claims.

In the drawings—Figure 1 is a plan view of a scow equipped with my invention; Fig. 2 is a transverse section thereof; Fig. 3 is a fragmentary plan view of the screens of one compartment, with certain of the screens broken away to show the relative meshes of the screens; Fig. 4 is an enlarged transverse sectional view on the line 4—4 of Fig. 2; Fig. 5 is a fragmentary vertical section taken through the screens, showing a modification. Fig. 6 is an enlarged section through one of the bulk heads between the compartments, showing the brackets for supporting the screens.

The scow 10 may be of any suitable or preferred construction or design, and is herein shown as a self-propelled scow, with its propelling power plant 11 located at the stern, and its pilot house 12 located near the bow.

Disposed along the longitudinal center of the scow are a plurality of compartments 15, 15, seven being herein shown, which are separated from each other by the transverse bulk heads or partitions 16. Each of said compartments is provided with swinging dumping doors 17, that are hinged at their sides to the sides of the compartment at the bottom thereof. Said doors when swung upwardly to the dotted line position shown in Fig. 2, constitute the bottoms of the compartments, and when released swing down to the full line positions shown in Fig. 2 to permit the contents of the compartments to be dumped. The doors are held in their upper or closed positions by the chains 19 that are trained about the lifting windlasses 20, 20 at the sides of the compartments on the scow deck.

Located above and at the sides of the compartments are flumes 22, 22 through which the mixture of water, gravel and sand is distributed to the several compartments, each flume being provided over each compartment with a discharge opening 23 through which the mixture falls from the flumes to the compartments below. The mixture of water, gravel and sand is discharged into said flumes through the usual sucker pipe 25 at the side of the scow and the pumps 26 which are located midships at the sides of the compartments 15. The outlet pipes 27, 27 of said pumps discharge centrally into the flumes through the openings 28. The engines 29, which operate said pumps, may receive steam from the boilers of the propelling power plant when the scow is self-propelled.

The construction just described constitutes, in itself, no part of the present invention, although my improvements are very advantageously adapted to said construction. The mixture of gravel, sand and water is discharged centrally into the flumes, from which the central compartment is first filled, after which the compartments toward the ends of the scow are gradually filled in the usual manner.

In accordance with my invention the compartments are provided with supporting and grading screens which extend from side to side and end to end of the compartments and may be removably supported on brackets 35, 36 attached to the lateral sides and bulk heads of the compartments. As herein shown each compartment is equipped with three superposed supporting and grading or separating screens 37, 38, 39; and in this arrangement the lowest screen is of the finest mesh, the top screen the coarsest mesh and the intermediate screen is of a mesh between the two extremes.

Preferably, and in order to facilitate the assembling of the screens and the removal thereof, said screens, or at least the middle and bottom screens, are each made of a number of sections, each screen being shown as made of three sections.

It will be understood that when the screens are in place the dumping doors will occupy their open positions, and at this time the door supporting chains may be trained up along the inner sides of the door, through clearance openings or notches 42 at the sides of the screens, as shown in full lines in Fig. 2.

In the use of the scow equipped with the screens, the large stones discharged from the flumes into the compartments are intercepted by the upper screen, while the remainder of the material passes to the intermediate screen. Said intermediate screen intercepts the larger particles of material which fall thereon, allowing the remainder to fall to the lowermost screen where the finest material intended for use is intercepted, while allowing the fine sand to fall through said lowest screen back to the bottom of the body of water. In this manner the granular material is automatically graded into the different meshes desired, while the scow is being loaded, thereby facilitating the handling of the material at the dock, and rendering it unnecessary to transport a large tonnage of material having little or no value, to-wit, the fine or so-called torpedo sand.

In some locations a smaller number of screens may be employed, as for instance, where the gravel handled runs fairly uniform as to size.

In cases where it is desired to save the finest sand an imperforate plate may be substituted for the lowermost screen, and one or more screens used above the same to grade or separate the gravel and sand.

In order to facilitate the passage of the water from the body of the gravel in the compartments, I may provide each compartment with one or more pipes 45, as shown in Fig. 5, which extend upwardly from the bottom screen through the compartment. These vertical pipes are perforated to permit the water to flow thereinto and thence downwardly through the lower end thereof into the water below. The perforations in said pipes are sufficiently small to avoid the leakage into the pipes of gravel of a size which is to be intercepted and retained by the finest screen employed in the equipment. The pipes 45 are preferably made of relatively short sections which are joined end to end by flanges 46 which may be bolted, or otherwise secured together.

When the screens are made in sections, as shown in Fig. 3, the margins of the central screens and the inner margins of the side screens may be formed with opposed half-round recesses which, when the sections are fitted together, constitute openings to receive said pipes. The pipes do not extend through the top screens. Said screens are preferably made of relatively heavy steel plates perforated to the desired mesh so as to be sufficiently stiff to support the loads brought thereon.

In lieu of the plain screens, I may employ the box screens shown in my copending application for U. S. Letters Patent, filed of even date herewith, Serial Number 654,453. In the latter form of screen, each compartment is equipped with a plurality of closely-nested boxes removably supported in the compartment. The bottoms of the boxes constitute the screens for grading the material, and the side walls may be perforated to permit the ready escape of water therefrom. The several sections constitute units which may be separately handled, thus facilitating the unloading of the graded material from the scow.

I may apply my improvements to a scow designed only for transporting gravel and sand, in which event the dumping doors may be dispensed with. The use of the screens removably fitted in the compartments of a dumping scow, however, possesses the advantage of enabling the scow to be used for both classes of work. Thus the scow shown may be employed to transport refuse material out to sea, and after the load is dumped the scow may be equipped with the screens and loaded with gravel to be transported to shore on the return trip of the scow.

The construction of the scow shown affords ample space to carry the screen equipment when not in use.

I claim as my invention:—

1. A scow having a compartment which is open at its top and at its bottom and a supporting and separating screen for material extending across the compartment between the top and the bottom thereof and supported on the walls of the compartment.

2. A scow having a compartment which is open at its top and at its bottom, a plurality of superposed supporting and separating screens for material extending across the compartment and supported on the side walls thereof, the mesh of the upper screen being larger than the mesh of the lower screen, substantially as described.

3. A scow provided with a longitudinally arranged series of compartments which are open at their tops and at their bottoms, and supporting and separating screens for material arranged across the compartments between their tops and bottoms thereof, and supported on the walls thereof.

4. A scow provided with a longitudinally arranged series of open compartments which are separated by transversely arranged bulk heads, and supporting and separating screens for material extending across said compartments, between the tops and bottoms thereof, with means on the walls of the compartments for removably supporting the screens in place.

5. A scow provided with a longitudinally arranged series of compartments which are open at their tops and at their bottoms, and separated by transverse bulk heads, each compartment being provided with superposed supporting and separating screens for material extending thereacross and removably supported in the compartments, said screens diminishing in mesh from the upper to the lower screens.

6. A scow provided with a longitudinally arranged series of compartments which are open at their tops and at their bottoms, superposed supporting and separating screens for material in each compartment, the uppermost screen being of larger mesh than the lower screen, and brackets on the walls of said compartments upon which the screens are removably supported.

7. A scow provided with a longitudinally arranged series of open compartments, dumping doors at the lower sides of the compartments arranged, when swung upwardly, to constitute the bottoms of the compartments, with means for holding the doors in their upper positions, and supporting and separating screens for material placed across the compartments and supported on the walls thereof between the tops and the bottoms of said compartments.

8. A scow provided with a longitudinally arranged series of open compartments, dumping doors at the lower sides of the compartments arranged, when swung upwardly, to constitute the bottoms of the compartments, with means for holding the doors in their upper positions, and a plurality of superposed supporting and separating screens for material of graduated mesh extending across and removably supported in said compartments.

9. A scow provided with a longitudinally arranged series of open compartments, dumping doors at the lower sides of the compartments arranged, when swung upwardly, to constitute the bottoms of the compartments, chains and windlasses for holding the dumping doors in their uppermost positions and supporting and separating screens for material extending across and removably supported on the walls of said compartments, the screens being provided with marginal notches through which the chains extend when the doors are swung down.

10. A scow provided with a longitudinally arranged series of compartments open at their tops and at their bottoms, a flume arranged above and at the side of said compartments, with means for delivering granular material and water thereto, said flume being provided with a discharge opening through which the material is discharged into the compartments, and screens extending across the compartments between the upper and lower sides thereof.

11. A scow provided with a longitudinally arranged series of compartments which are open at their tops and at their bottoms, a flume arranged above and at the side of said compartments, with means for delivering granular material and water thereto, said flume being provided with discharge openings through which the material is discharged into the compartments, and superposed screens of graduated mesh in each compartment, extending thereacross between the tops and bottoms thereof.

12. A scow provided with a longitudinally arranged series of compartments which are open at their tops and at their bottoms, a flume arranged above and at the side of the compartments, with means for delivering granular material and water thereto, said flume being provided with a discharge opening through which the material is discharged into the compartments, screens extending across the compartments between the tops and bottoms thereof and perforated pipes extending through said screens and extending upwardly through the compartment.

13. A scow comprising a compartment which is open at its top and at its bottom, a separating and supporting screens for material extending across the compartment between its top and its bottom and supported on the walls thereof, and a perforated pipe extending upwardly above the screen and open at its lower end to the space below the screen.

14. A scow having a compartment which is open at its top and at its bottom, a separating and supporting screen for material composed of a plurality of screen sections extending across said compartment, and brackets on the side walls of the compartment for removably supporting the sectional screen.

In testimony, that I claim the foregoing as my invention I affix my signature in the presence of two witnesses, this 5th day of October, A. D. 1911.

THOMAS C. JACKSON.

Witnesses:
GERTRUDE E. DOWLE,
W. L. HALL.